Sept. 29, 1959 G. GILBERT ET AL 2,905,969
APPARATUS AND METHOD FOR PRODUCING EMBOSSED
THERMOPLASTIC FILM AND THE LIKE
Filed Jan. 4, 1955 6 Sheets-Sheet 1

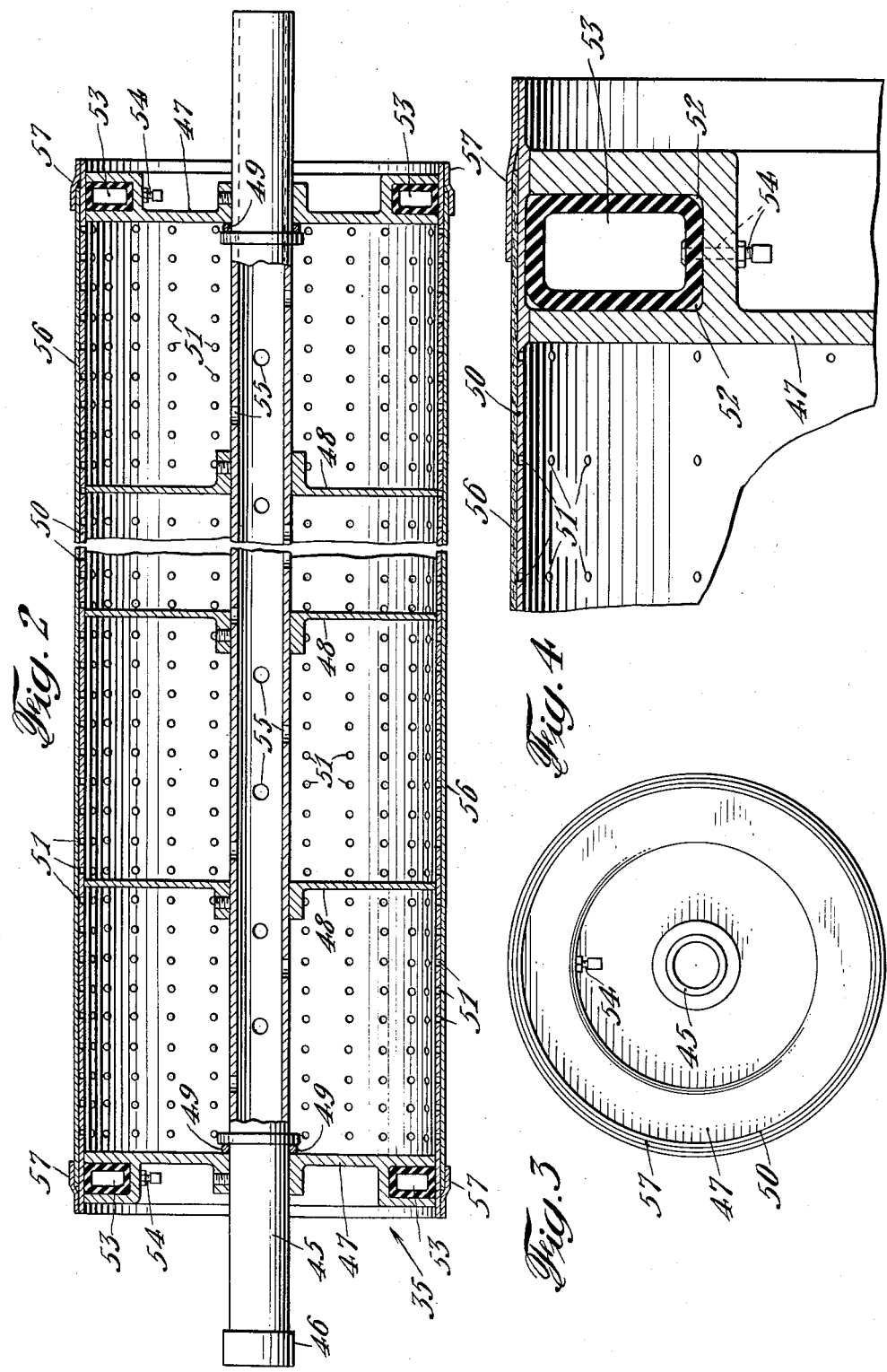

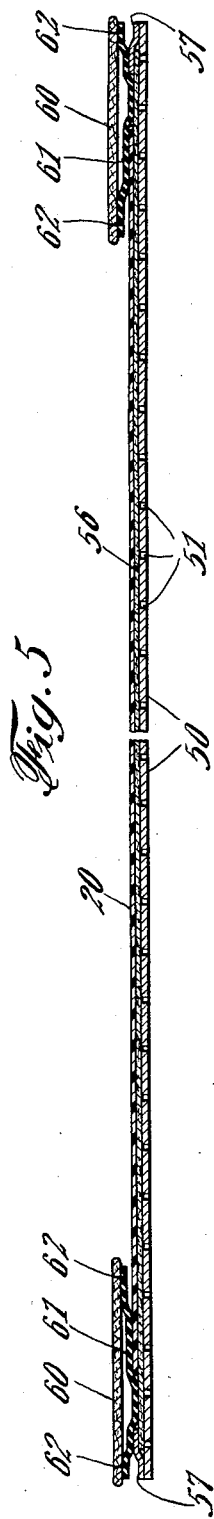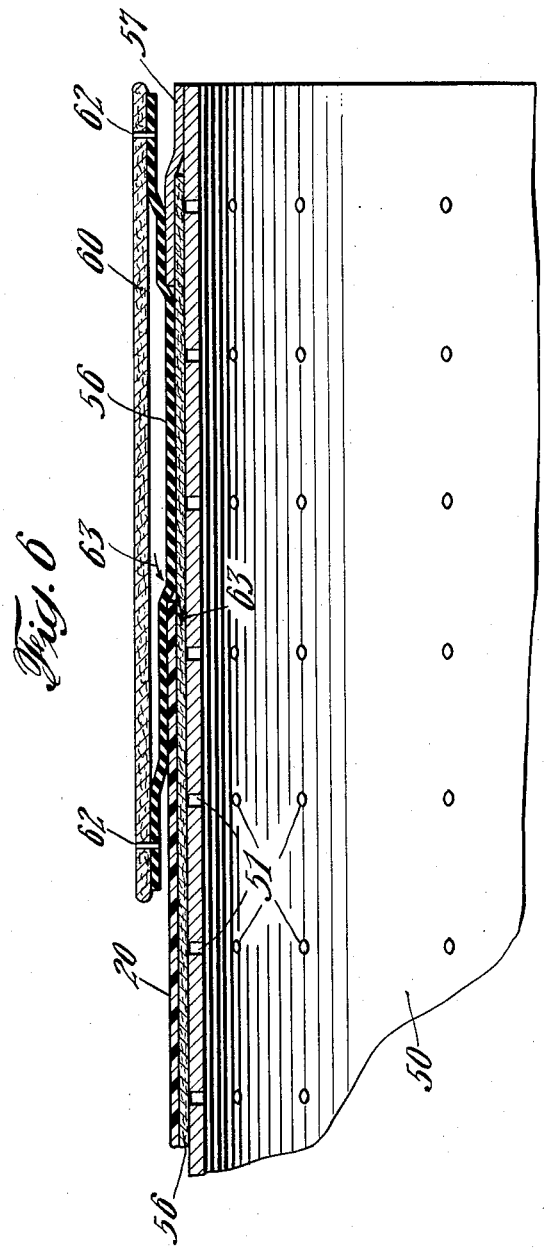

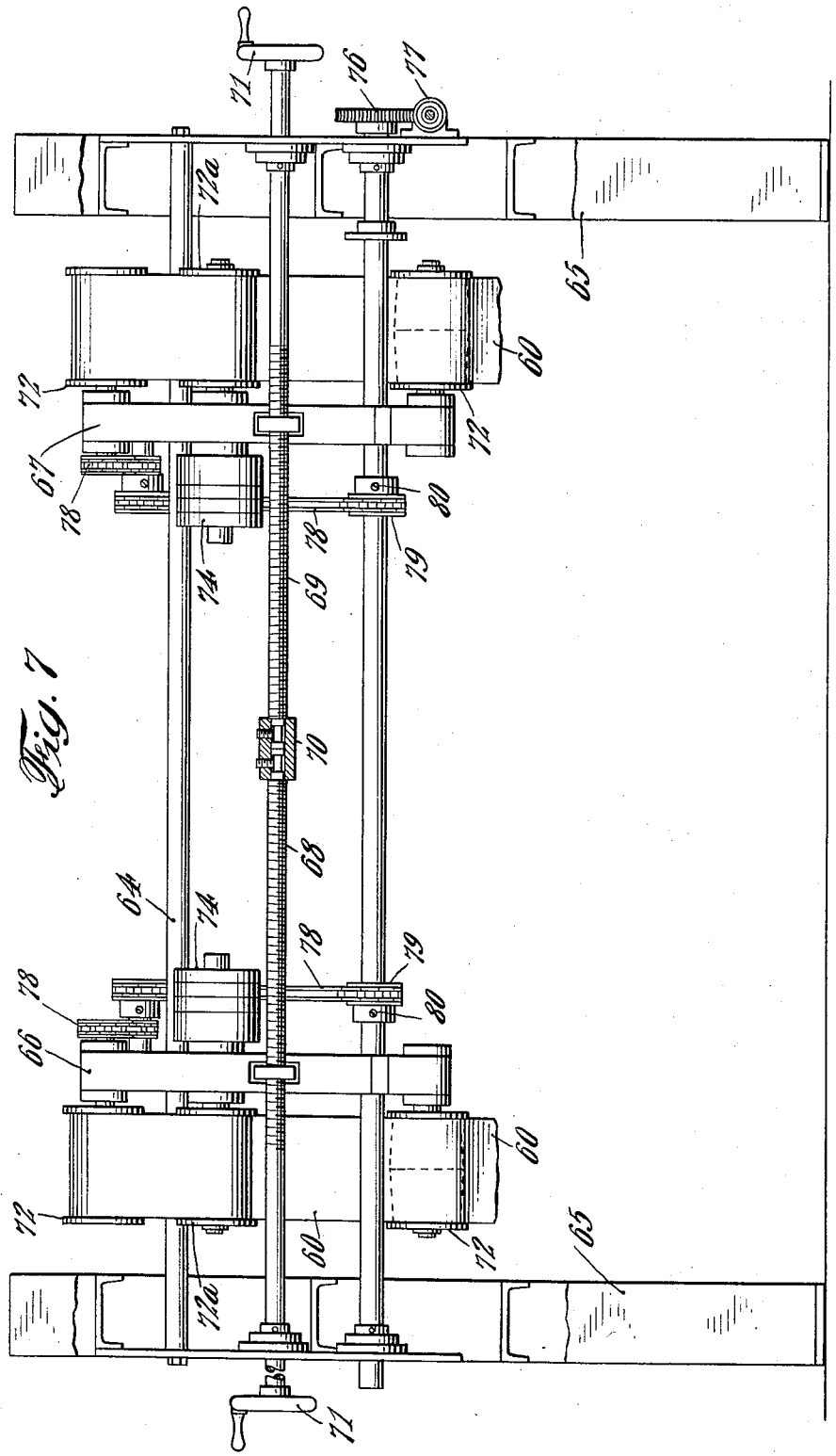

Sept. 29, 1959 G. GILBERT ET AL 2,905,969
APPARATUS AND METHOD FOR PRODUCING EMBOSSED
THERMOPLASTIC FILM AND THE LIKE
Filed Jan. 4, 1955 6 Sheets-Sheet 5
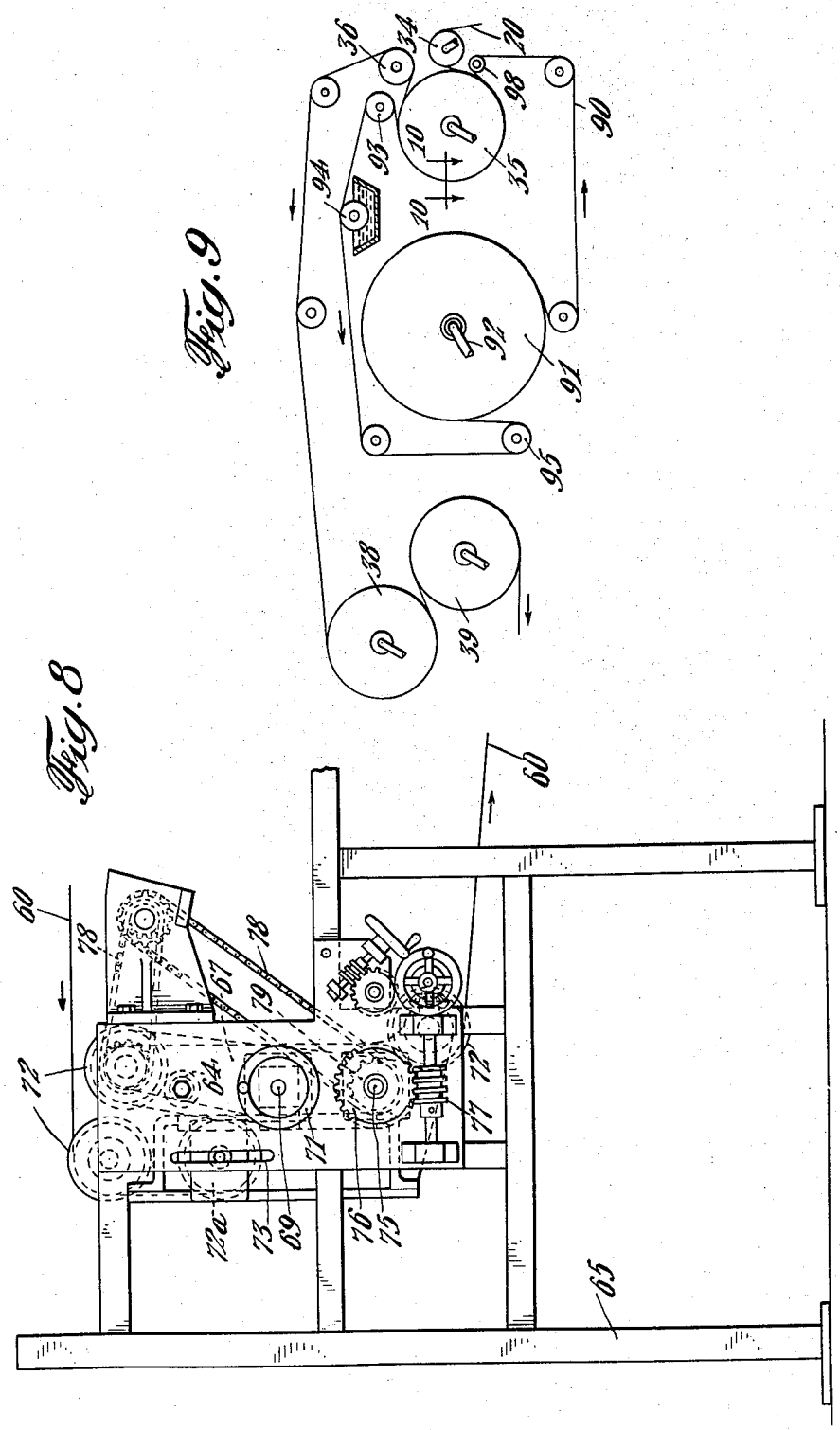

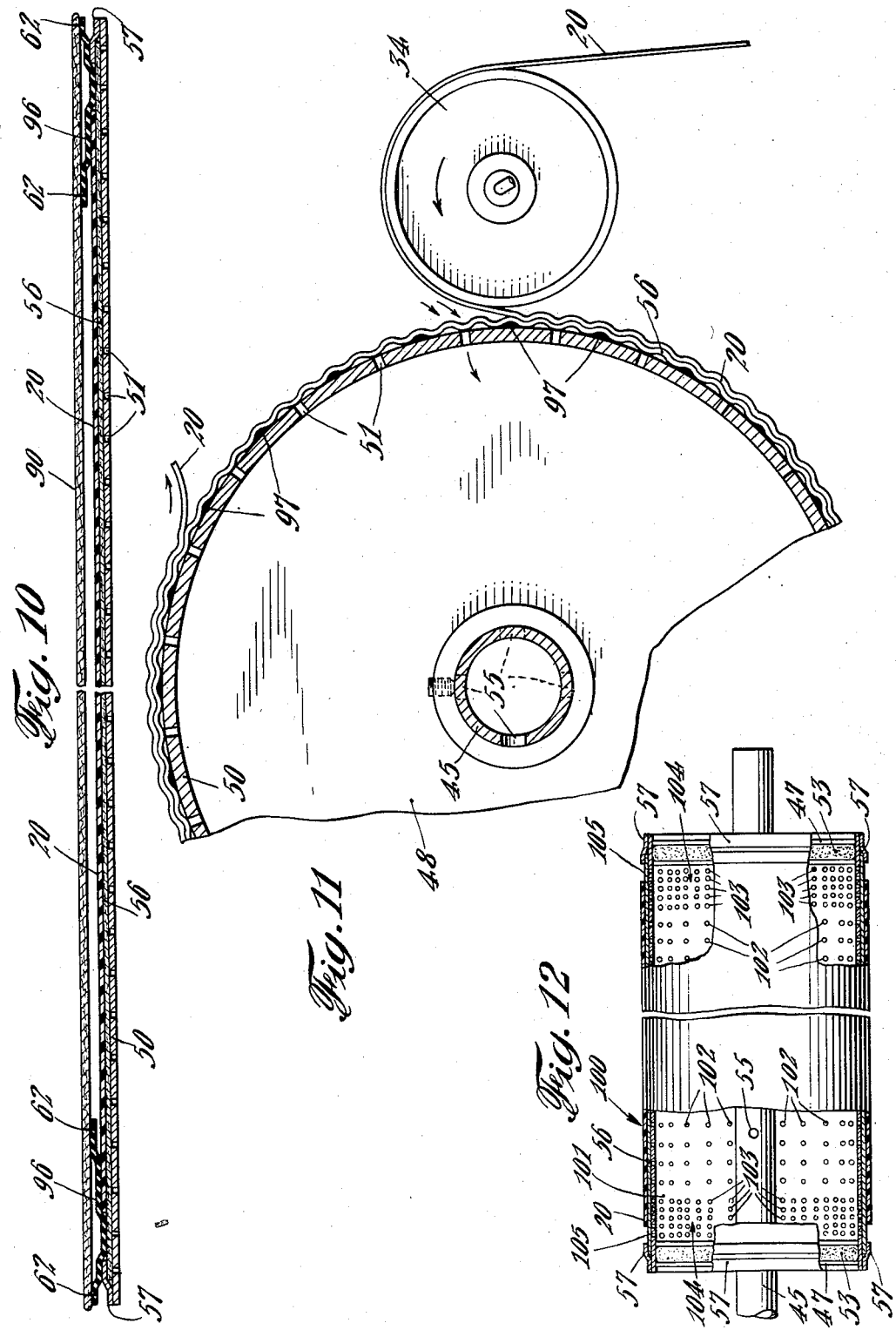

United States Patent Office 2,905,969
Patented Sept. 29, 1959

2,905,969
APPARATUS AND METHOD FOR PRODUCING EMBOSSED THERMOPLASTIC FILM AND THE LIKE

Geoffrey Gilbert, Preakness, and William L. Prendergast, Hawthorne, N.J., assignors to Chavannes Industrial Synthetics, Inc., Haledon, N.J., a corporation of Delaware Application January 4, 1955, Serial No. 479,696

18 Claims. (Cl. 18—19)

This invention relates to a method and apparatus for embossing thermoplastic film and more particularly to a method and apparatus for carrying out the same in which the thermoplastic film is drawn against an embossing surface by means of suction.

Thermoplastic film may be embossed by heating the film until it is hot and soft and then subjecting the surface of the film to be embossed to reduced air pressure so that the differential pressure across the film urges the film against and into intimate contact with an embossing surface. More particularly, the film after being heated may be led into contact with one surface of a porous or permeable embossing member while the opposite surface of the embossing member is exposed to low pressure or a partial vacuum. The sharpness of definition and depth of the pattern thus embossed upon the thermoplastic material is a function of the local pressure to which each portion of the material is subjected. A weaker local pressure in some areas than in others tends to produce a non-uniform pattern.

Certain features of the apparatus described herein relate to means for minimizing leakage or passage of air through that portion of the embossing member underlying the marginal portions of the thermoplastic material. This eliminates the undesirable result of having on the embossed film a marginal portion or selvedge having poorly defined embossing.

Still other features of the present invention relate to a suction embossing drum suitable for use in achieving high speed, low cost embossing of thermoplastic film as well as an arrangement for withdrawing or removing the film from the suction drum so as to avoid damage thereto.

One type of embossing member which has been proposed is a rotating embossing drum having its interior divided into two zones, suction being applied to one but not to the other. One arrangement for accomplishing this was to utilize a suction box, generally in the shape of a sector of a cylinder mounted inside the embossing drum and about which the drum may be rotated. No suction was applied to that portion of the embossing surface which was not covered and sealed by the thermoplastic film undergoing embossing. However, we have found that such an arrangement involved some disadvantages not present in the apparatus to be described herein. For example, it is desirable that the embossing drum be adapted for the ready interchange of one embossing surface for another having a different pattern, and this could not be done readily with the rather massive former apparatus. The division of the embossing drum into two zones resulted in a relatively costly drum and the expense was even greater because of the necessity for stockpiling embossing drums of various sizes. This will be appreciated when it is understood that a pattern having a given repeat length may only be mounted on a drum having a circumferential dimension corresponding to or an integral multiple of the length of the repeat.

It is, therefore, a principal object of the invention to provide an improved apparatus especially well suited for embossing thermoplastic material at high speed and at a substantially reduced cost.

Another object is to provide apparatus capable of reproducing patterns on thermoplastic material with substantially maximum definition and uniformity over the entire material to be embossed including the marginal portions thereof.

A further object is to provide apparatus for embossing thermoplastic material which may readily be adapted to receive work material of widely varying dimensions.

A more specific object is the provision of an improved embossing drum especially well suited for embossing thermoplastic material and adapted to be manufactured by high speed, mass production methods at relatively low cost.

In accordance with one embodiment of our present invention, the apparatus for embossing thermoplastic film includes an embossing drum or roll comprising a tubular shaft which may be closed at one end and adapted to be connected at its other end to a suction pump. A plurality of angular discs or spiders may be mounted in axially spaced relationship along the tubular shaft. A plurality of perforations are formed along the shaft intermediate each of the adjacent spiders so that all of the space therebetween is subjected to suction. The intermediate spiders serve to support an embossing sleeve along their peripheries while the end plates at the extremities of the sleeve, in addition to supporting the embossing sleeve, are adapted to be demountably sealed to the sleeve.

The embossing sleeve may comprise a rigid perforated shell which supports about its exterior surface porous material which forms the embossing surface. During operation of the apparatus, air is pumped from the interior of the embossing roll, and the entire interior of the embossing shell is subjected to suction. The rate at which the interior of the roll and the shell is pumped is such as compared to the rate at which air enters through the perforations in the shell of the embossing sleeve that the differential pressure required for carrying out the embossing is maintained even though air may enter relatively freely through the perforations in the shell underlying that portion of the embossing surface not covered by the thermoplastic film.

In order to avoid what may be termed long leakage path along which air may leak into the embossing drum through the porous embossing material underlying the marginal portions of the thermoplastic film, there may be provided a pair of relatively narrow parallel endless belts each of which is guided so as to come into close proximity with each of the edges of the thermoplastic film substantially throughout its travel about the embossing drum. These belts may be referred to as support belts. An impervious sealing belt is supported on the surface of each of the support belts in such manner as to overlie and be drawn into sealing engagement with any portion of the embossing surface subjected to suction but not covered by the thermoplastic film. A variation of this may include a cooling belt which contacts and cools the embossed thermoplastic film while the film is in contact with the embossing drum, with the cooling belt serving as the support for the sealing belts.

In one particular form of the embossing sleeve, it may be constructed so as to have circumferential bands or zones of greater porosity as compared to the remainder thereof and spaced so as to underlie the marginal portions of the thermoplastic film. The bands of greater porosity as thus located avoid long air leakage paths thereby to ensure even embossing of the film over its entire surface and including its extremities.

In such an apparatus the efficiency of the suction applied to the thermoplastic film is such that the film is conformed to the pattern of the embossing surface during the first relatively short portion of its travel about its embossing drum. In order to set the material it is cooled while still on the embossing drum. This may be effectively accomplished by applying a coolant such as water directly to the exposed surface of the thermoplastic film, in a region lying between a first point sufficiently beyond where the thermoplastic film initially comes into contact with the embossing surface to avoid premature cooling and a second point where it is sufficiently cool to be removed from the embossing drum. The cooling requirements will vary in accordance with the nature of the embossing as well as the nature and thickness of the material being embossed. Such after-cooling as required may be provided by passing the film over cooled drums, by further applying coolant to the film itself or by other suitable means. When liquid coolant is utilized and applied directly to the thermoplastic film, means are provided for removing such liquid preferably after the film has been completely set. For this purpose, slotted tubular members to which suction is applied may be provided in the path of the advancing film, for removing the liquid from its surface. For the same purpose, a perforated drum may also be provided having its interior maintained at a partial vacuum, more particularly at a pressure which is below atmospheric pressure but which is higher than that of the embossing drum.

Where the thermoplastic film comes into contact with the embossing drum a line of contact between the film and the embossing surface is formed on one side of which the embossing surface is exposed to the atmosphere while on the other side the embossing surface is in contact with the film and consequently is sealed off from the atmosphere. Because the embossing surface is formed of porous material, air seeking to enter the embossing drum through the porous material tends to follow long leakage paths extending below that portion of the thermoplastic film immediately adjacent the line of contact. Means are provided for maintaining the circumferential length of the leakage paths to a minimum. This may be accomplished by forming, in the embossing material, narrow axially extending barriers, which may be impervious or substantially impede the passage of air.

It has also been found that due to the tendency of the embossed material to adhere to the embossing surface extreme care must be exercised to prevent the thermoplastic material from winding about the embossing drum and thereby being damaged or destroyed. We have found that when the embossing apparatus includes a stripper roll, one which takes the film from the embossing drum, driven through a speed regulator so that it may be selectively driven at speeds greater than the peripheral speed of the embossing surface then winding of the film about the embossing drum is readily prevented. We may also utilize a perforated drum the interior of which is maintained at a pressure below that of the atmosphere but substantially above that inside the embossing drum. Such a suction stripping roll may also be driven through a speed regulator.

Further objects, features, and advantages of this invention will be apparent from the following description and the accompanying drawings in which:

Figure 2 is a section view of line 2—2 of Figure 1;

Figure 3 is an end elevational view of the embossing drum shown in Figure 2;

Figure 4 is a fragmentary sectional view on an enlarged scale showing the manner in which the embossing sleeve is sealed to the embossing roll;

Figure 5 is a fragmentary sectional view of the embossing roll and sleeve showing the thermoplastic film in contact therewith and one arrangement of sealing means for preventing the leakage of air into the embossing drum;

Figure 6 is a fragmentary sectional view thereof on an enlarged scale showing the interaction of the thermoplastic film, the embossing drum and the sealing means;

Figure 7 is an elevational view showing an adjustable mounting and guiding means for the sealing means shown in Figure 5 and taken through the line 7—7 of Figure 1;

Figure 8 is a side elevational view of the apparatus shown in Figure 7;

Figure 9 is a schematic view of another embodiment of the embossing apparatus;

Figure 10 is a fragmentary view taken through the line 10—10 of Figure 9;

Figure 11 is an elevational view partially in section showing the embossing sleeve and the thermoplastic film as they initially come into contact with each other; and Figure 12 is a fragmentary sectional view of another type of embossing drum constructed in accordance with this invention.

Figure 1:
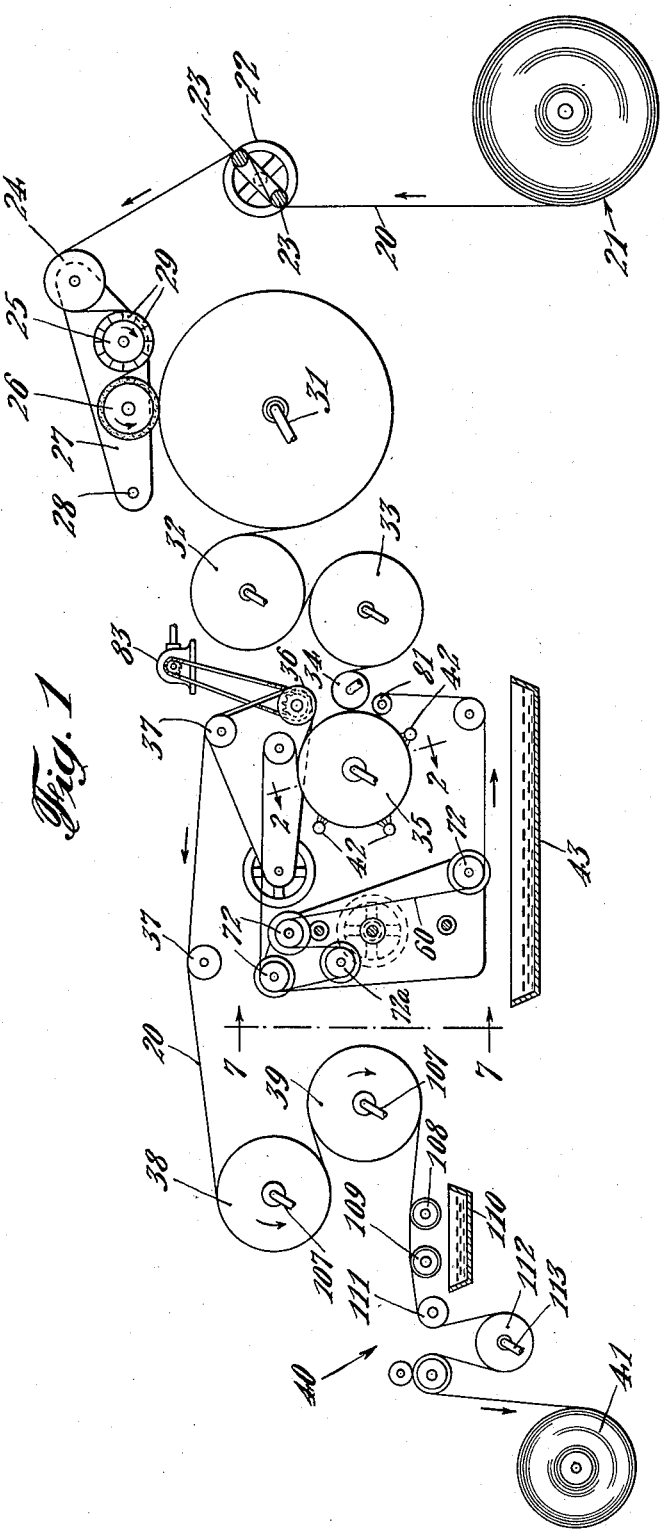
Figure 1 is a schematic side elevational view of embossing apparatus.

In the embodiment of Figure 1, thermoplastic film 20 is fed from a supply roll 21, through an angularly displaceable tensioning device 22. Tensioning device 22 may comprise two spaced rods 23 over and between which the film 20 slides and the angular disposition of which relative to the path of the film, as determined by supply roll 21 and idler 24, controls the tension applied to the film. Idler 24 together with an expander 25 and a pressure roll 26 are rotatably mounted between a pair of pivoted arms 27 only one of which is shown and is pivoted at 28.

Expander 25 may have a plurality of elongated slats 29 mounted circumferentially with adjacent slats displaceable longitudinally to a limited degree relative to each other. Hence, as film 20 passes about expander 25, adjacent slats are alternately displaced in opposite directions parallel to the surface of the film in engagement therewith thereby expanding film 20 laterally to remove wrinkles and to stretch the material laterally to a limited extent. From expander 25 film 20 passes to pressure roll 26 the surface of which may be covered with rubber or other suitable material having a relatively high coefficient of friction. The film after passing partially about pressure roll 26 engages the surface of a first drum 30 which is relatively large and driven through a speed regulator to permit variation in its angular velocity for reasons which will be pointed out. In practice the weight of arms 27 together with the members supported thereon provide sufficient force to avoid slippage between film 20 and the surface of drum 30. Drum 30 is mounted for rotation about its axis and is preferably provided with an axial inlet and outlet to permit the introduction of a heating medium into the substantially hollow interior thereof. For convenience only inlet 31 is shown in the drawing and it will be understood that a suitable outlet is also provided. Suitable heating mediums for drum 30 as well as succeeding heating drums to be described include steam, heated oil or heated water.

Drums 32 and 33 are rotatably mounted to receive film 20 in succession, drum 32 taking the film from drum 30 and drum 33 taking the film from drum 32. Drum 34 is similarly mounted for rotation and constitutes the final heating drum following which film 20 passes partially about embossing drum 35. In the case of thermoplastic films made of polyvinyl-chloride, all of the drums 30, 32 to 34, provided with suitable inlets and outlets for a heating medium as described in connection with drum 30, are heated to provide for suitable heating of the film so that when it comes into contact with the embossing drum it is already at a temperature suitable for embossing. Drums 32 to 34 are each positively driven and may be driven through suitable chains and sprockets from the same drive provided for the first drum 30 but with a small amount of lead to maintain film 20 under tension while it is heated to avoid the possibility of the film becoming wrinkled due to expansion.

Embossing drum 35 is similarly driven with a peripheral speed equal to the speed of the advancing film, and its interior is connected to a suitable pump (not shown) for removing air therefrom. The partial vacuum created within the interior of embossing drum 35 acting through the embossing material to be described causes embossing of the film. Embossing drum 35 is not heated but is located in such close proximity to the final heating drum 34 that there is only a minimum distance between the two to be bridge by the heated thermoplastic film 20. The S-shaped path traversed by the film in passing about drum 34 and embossing drum 35 facilitates the passage of the film therebetween with a minimum amount of heat loss. Embossing of film 20 takes place in the first few inches of its travel about the embossing drum whereupon it is cooled in situ to a sufficiently low temperature to permit removal by stripping roll 36. From stripping roll 36 the film passes over idlers 37 to after cooling drums 38, 39 past liquid coolant removing means indicated generally at 40 and then to take-up roll 41.

A liquid coolant, such as water, may be used to cool film 20 after it has been embossed and while still on embossing drum 35. The water may be directed or sprayed onto the exposed surface of film 20 as by means of perforated tubes 42. A drip collector 43 is provided as indicated to catch the fluid which may fall from the film.

As shown most clearly in Figures 2, 3 and 4, embossing drum 35 comprises an elongated tubular shaft 45 closed at one end by a cap 46 and adapted at its other end to be connected to a suction pump. A pair of annular end plates 47 each having a central opening formed therethrough are fixed to shaft 45 adjacent either end thereof. A plurality of annular spiders 48 also provided with central openings are spaced longitudinally along and fixed to shaft 45 intermediate end plates 47. The connection between end plates 47 and shaft 45 is rendered airtight as by means of O-rings 49 clamped between the plates and shoulders provided for that purpose on shaft 45.

The peripheral portions of end plates 47 and spiders 48 serve to support cylindrical embossing sleeve 50 having a plurality of spaced perforations 51 formed therethrough. Positive engagement as well as a readily demountable airtight joint is provided between each of the end plates 47 and sleeve 50. This may be advantageously accomplished by providing an annular channel 52 on the outwardly presented side of each of the end plates 47. An inflatable tubular member 53 having a valve stem 54 projecting therefrom is mounted in each of the channels 52 which open radially outwardly adjacent the periphery of each end plate 47. When inflated, tubular members 53 engage the respective ends of sleeve 50 and end plates 47 to form a substantially airtight seal therebetween. Removal of sleeve 50 from end plates 47 and spiders 48 may be readily accomplished when tubular members 53 are deflated.

Shaft 45 along the portion thereof extending between end plates 47 is provided with a plurality of openings 55 which provide communication between the interior of shaft 45 and the interior of cylindrical sleeve 50. If desired spiders 48 may also be perforated to minimize the possibility of unequal pressure distribution axially along the interior of sleeve 50. The external surface of sleeve 50 is coated or covered with porous material 56 which forms the embossing surface of the embossing drum. As will be described in detail perforations 51 are so formed in sleeve 50 and embossing material 56 is so applied to the surface of sleeve 50 as to avoid long circumferential leakage paths.

The type of embossing material 56 utilized will depend upon the kind of pattern it is desired be formed along the thermoplastic film 20. While such materials may vary widely including woven or knitted fabrics, as well as other materials, it is essential that they be sufficiently porous to permit embossing by suction applied therethrough to film 20. In practice the axial extent of the perforated portion of sleeve 50 and embossing material 56 carried thereon should be at least as long as the width of the material to be embossed. Usually the width of film 20 is somewhat less than the axial length of the embossing surface. Impervious annular bands 57 which may be in the form of permanently tacky masking tape are applied to the peripheral portions of the embossing sleeve so that air may not enter the surface of the embossing material 56 thus covered and leaving an effective embossing surface the axial extent of which approximates the width of the material to be embossed but is slightly longer. The difference in dimensions between the film 20 and the axial length of the embossing surface not covered by impervious bands 57 may be varied to some extent as desired but should be less than the combined width of the means provided adjacent each end of the embossing drum for preventing leakage of air along the lateral margins of film 20 when in contact with the drum.

In the embodiment shown in Figures 1 and 5 to 8 a pair of endless support belts 60 are supported so as to pass partially about and in close proximity to the extremities of embossing drum 35. In order to facilitate the use of belts 60 in combination with different thermoplastic films which vary in width over a fairly wide range, belts 60 are mounted so that they may be laterally displaced toward and away from each other. On the surface of each of the belts 60 presented toward embossing drum 35 there may be stitched or otherwise secured an endless sealing belt 61 made of rubber or other suitable flexible, impervious material. As shown most clearly in Figures 5 and 6, belts 60 with sealing belts 61 supported thereon are located so that sealing belts 61 may seal off the exposed surface of embossing material 56 extending between either edge of film 20 and the corresponding impervious band 57. It will be evident that with suction applied to the interior of embossing drum 35 each of the sealing belts 61 will be drawn against the exposed embossing material since the sealing belts are only attached along their marginal portions to belts 60 as indicated at 62 and are free to be drawn by suction into sealing engagement with the exposed embossing material. As a consequence, leakage of air in the direction of arrow 63 (Figure 6) through the embossing material adjacent to and underlying the peripheral portions of film 20 is prevented.

Means for supporting and guiding belts 60, 61 include an elongated guide member 64 supported between frame members 65 in spaced parallel relation to embossing drum 35. Support members 66, 67 are each slidably mounted on guide member 64 and are in threaded engagement respectively with threaded shafts 68, 69. Threaded shafts 68, 69 are each threaded in opposite directions with respect to each other and in addition to being rigidly connected by coupling 70 are rotatably supported in frame members 65 parallel to guide member 64 and embossing drum 35. Rotation of cranks 71 mounted on either one of the threaded shafts 68, 69 serve to rotate both of them in the same direction thereby causing movement of support members 66, 67 toward or away from each other as the case may be.

A suitable number of alined pulleys are provided on each of the support members 66, 67. In the present instance four crowned pulleys 72 are provided on each of the support members 66, 67. One of these, as for example, pulley 72a conveniently serves as a tensioning or slack take-up pulley and for this purpose its shaft is mounted for vertical displacement in a slot 73 provided in its respective support member 66 or 67. When a greater force than that provided by the weight of pulley 72a alone is required additional weights indicated at 74 may be mounted on its shaft. Belts 60 are driven at a speed equal to the peripheral speed of embossing drum 35 due to the engagement of sealing belts 61 therewith. Also a drive shaft 75 may be journaled to frame member 65 and carries gear wheel 76 driven by worm 77 which in turn is suitably connected to the drive means provided for rotating drums 30, 32–34 and embossing drum 35. Drive shaft 75 may be connected to one of the pulleys 72 on each of the support members 66, 67 by means of chains 78 and sprockets 79. When it is desired to displace frame members 66, 67 laterally set screws 80 which serve to secure each of the sprockets 79 to drive shaft 75 are first loosened. After the desired adjustment of the frames 66, 67 has been carried out sprockets 79 are also similarly shifted and then reset by tightening set screws 80.

As was pointed out, the thermoplastic film 20 is heated to embossing temperature before it is applied to embossing drum 35. Immediately after the embossing takes place and while travelling about the embossing drum the film is cooled substantially below its embossing temperature so that it may be removed from the embossing drum. Consequently, embossing drum 35 is maintained at a temperature well below the embossing temperature of the film. The actual embossing operation, by which is meant deformation of the film to conform to the surface of embossing material 56, takes place within the first few inches of the travel of film 20 about the embossing drum. In order for the sealing belts 61 to provide the maximum effect desired they should be in position to engage the embossing drum as close as possible to where thermoplastic film 20 first engages the drum. As shown in Figure 1 rollers 81 are located in close proximity to drum 34. This is facilitated by utilizing relatively small diameter rollers as shown, thereby permitting the location of each of the rollers 81 (only one of which is shown in Figure 1) in the angle formed between drum 34 and embossing drum 35.

Film 20 has a tendency to adhere to the embossing material 56 as a result of the intimate contact formed therebetween when the film is embossed. If the thermoplastic film follows the embossing drum far enough to reach the line along which the thermoplastic film joins the embossing drum from heating drum 34, the machine would have to be stopped and the condition rectified to avoid damage to the film. To prevent this, stripping roll 36 is connected to the drive means by suitable chains and sprockets through a speed regulator 83 so that it may be driven at a speed greater than the peripheral speed of embossing drum 35 so as to apply a positive pulling effect on the thermoplastic film thereby to prevent winding of the film about the embossing drum beyond the take-off line. Additionally, the surface of stripping roll 36 may be perforated and the interior thereof connected to a suction pump. The suction applied to thermoplastic film 20 by stripping roll 36 is substantially less than that applied by embossing drum 35. For example, we may utilize a partial vacuum in stripping roll 36 corresponding to approximately four or five inches of water while that in embossing drum 35 may be approximately 135 to 165 inches of water.

In the embodiment shown in Figures 9 and 10 of the drawing thermoplastic film 20 is heated to embossing temperature, as was described in Figure 1, and from the final heating drum 34 passes to embossing drum 35. Here the thermoplastic film is cooled by means of a cooling belt 90 which preferably is somewhat wider than the thermoplastic film. A cooling drum 91 having an inlet connected by a conduit 92 to a source of a suitable coolant such as water, as well as an outlet not shown, is rotatably supported adjacent to embossing drum 35. Since cooling belt 90 is driven at the peripheral speed of embossing drum 35, cooling drum 91 should have a sufficiently large diameter to insure adequate cooling of belt 90. A ratio of about 2 to 1 between the diameter of drum 91 and embossing drum 35 has proven to be satisfactory in practice. As was described in connection with rollers 81, roll 98 is of relatively small diameter and is mounted in close proximity to drum 34. After passing about embossing drum 35 cooling belt 90 passes over roll 93 and then over applicator roll 94 which is supported so that it is partially immersed in cool water. This serves to precool belt 90 so as to remove some of the heat taken on from thermoplastic film 20 before it reaches cooling drum 91. Roll 95 corresponds to slack take-up pulleys 72a and may be similarly mounted for limited vertical displacement so as to maintain cooling belt 90 sufficiently taut.

As is clearly shown in Figure 10 a pair of sealing belts 96 similar to sealing belts 61 are provided, one being connected to each of the peripheral portions of belt 90. The width of cooling belt 90 is so chosen with respect to the width of thermoplastic film and the length of the embossing drum that sealing belts 96 are in position to seal off the exposed surfaces of embossing material 56 adjacent each edge of thermoplastic film 20.

As has been indicated, embossing drum 35 is subjected to suction over the entire 360° of its surface. We have found that with less than about 90° of the surface of the embossing drum left bare between where the thermoplastic film leaves and engages the drum it is possible to maintain sufficient vacuum in the drum to insure proper embossing. The size and distribution of perforations 51 formed in the embossing sleeve 50 are important since excessive size or too great a concentration of the perforations may make it impossible or at least economically unfeasible to maintain the degree of vacuum within the embossing drum necessary to achieve embossing of the thermoplastic film. On the other hand, perforations 51 must be sufficiently large and close together so that the suction applied will cause good embossing. We have found that with the embossing materials most commonly used, perforations 51 may range from about .040 of an inch in diameter spaced one inch from center to center to about 1/16 of an inch in diameter spaced one inch apart circumferentially and two inches apart axially relative to the drum. With the size and distribution of the perforations in those ranges a pump having a capacity of about 150 to 200 cubic feet of air per minute makes possible the attainment of a partial vacuum equivalent to about 5 to 15 inches of mercury. In one specific construction, cylindrical sleeve 50 had a diameter of 12 inches and an axial length of 60 inches. Perforations having a diameter of .040 of an inch on 1 inch centers were provided in the sleeve. When operated with an open area of about 75 degrees in conjunction with a pump having a capacity of about 150 cubic feet of air per minute a vacuum condition suitable for embossing was readily maintained.

For reasons which will now be described perforations 51 are arranged in relatively straight lines axially along sleeve 50. Embossing material 56 which may be a length of fabric equal to the circumference of the exterior of shell 50 and incorporating at least one whole repeat of the desired pattern is preferably attached to the embossing sleeve surface by means of a thermosetting adhesive. The adhesive is applied to the exterior surface of shell 50 in axial stripes which extend between each of the rows of perforations 51. Then the embossing material 56 is placed in position about the sleeve and the adhesive is cured. As shown most clearly in Figure 11 the adhesive not only bonds the embossing material to sleeve 50 but also fills in the interstices of the material to form impervious lines 97 which block the movement of air circumferentially through the embossing material thereby limiting the length of the circumference leakage paths to substantially less than the intervals between adjacent rows of perforations 51.

Another arrangement for insuring uniform embossing of the thermoplastic film all the way to each of the lateral extremities thereof is shown in Figure 12 where embossing drum 100 may be similar to embossing drum 35 as was previously described but is provided with a cylindrical sleeve 101 which in addition to perforations 102 corresponding to perforations 51 of sleeve 50 is also provided with perforations 103 arranged in two annular bands 104 adjacent the opposite extremities of sleeve 101. As before, embossing material 56 is applied to cylindrical sleeve 101 and the ends thereof are sealed off by impervious bands 57. The dimensions of cylindrical sleeve 101 as compared to the width of thermoplastic film 20 are such that a small space of approximately 1 inch in width is left between each of the edges of the thermoplastic film and the bands 104 as indicated at 105. Perforations 103 are located so as to underlie the space 105 as well as the marginal edge portions of the thermoplastic film 20 and are spaced substantially closer together than are perforations 102. With the interior of the embossing drum 100 connected to a suction pump, more suction is applied to the marginal portions of thermoplastic film 20 which overlie perforations 103 than is applied to the remainder of the film which overlies perforations 102. The number of perforations 103 provided per unit area of bands 104 is sufficient to insure the maintenance of sufficient suction all the way out to the very edge of the film to cause satisfactory embossing. While the uncovered portions of bands 104 along the arc left exposed by the film increases to some extent the rate at which air may enter the drum, it has such a relatively small effect that embossing is not interfered with. This arrangement does have a disadvantage in that since the bands 104 must be kept relatively narrow, thermoplastic films varying substantially in width require different embossing drums.

Referring once again to Figure 1, cooling drums 38, 39 are each provided with inlets 107 for a suitable cooling medium such as cold water as well as outlets not shown. Coolant removing means 40 includes slotted tubes 108, 109 which serve to remove water from film 20, trough 110 being positioned to collect what water may drip therefrom. From slotted tubes 108, 109 film 20 advances over idler 111 to perforated suction roller 112 having an axial inlet 113 connected to a suction pump (not shown) which serves to maintain approximately the same partial vacuum in roller 112 as is maintained in stripping roller 36.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. Apparatus for embossing thermoplastic film and the like, comprising means for heating and advancing said film along a predetermined path, means in advance of said heating means for tensioning said film laterally and longitudinally, an embossing drum rotatably supported along said path following said heating means and having a porous substantially cylindrical embossing surface through which the atmosphere may communicate with the interior of said embossing drum, means for applying suction to said embossing drum and said embossing surface throughout the entire 360° thereof, means for guiding said film about a major portion of said embossing surface and including a stripping roll rotatably supported along said path in close parallel spaced relation with said embossing drum, said embossing surface having an axial extent greater than the width of said film, said film throughout its entire width engaging said embossing surface, means for controlling entrance of air into said embossing drum through the portions of said embossing surface adjacent to and engaging the lateral extremities of said film, means for controlling the entrance of air into said embossing drum through the portion of said embossing surface engaging said film adjacent to a line along which said film initially engages said surface, means for rotating said embossing drum at a peripheral speed equal to that of the advancing film, and means for selectively rotating said stripping roll at a speed greater than that of said embossing drum.

2. Apparatus for embossing thermoplastic film and the like, comprising means for heating and advancing said film along a predetermined path, means in advance of said heating means for tensioning said film laterally and longitudinally, an embossing drum having a porous substantially cylindrical embossing surface and rotatably supported along said path following said heating means, means for applying suction to the interior of said embossing drum and to said surface throughout the entire 360° thereof, means for guiding said film around said embossing drum through an extended arc and including a stripping roll adjacent to and following said embossing drum for engaging said film, means for rotating said embossing drum and said stripping roll, and means for selectively varying the speed of rotation of said stripping roll relative to that of said embossing drum.

3. Apparatus for embossing thermoplastic film and the like having a predetermined width, comprising means for heating and for advancing said film along a path, embossing means along said path following said heating means and including a rotatably mounted embossing drum having a porous substantially cylindrical embossing surface the axial extent of which is greater than the width of said film, means for applying suction to the interior of said embossing drum and to said surface throughout the entire 360° thereof, means for guiding said film around said embossing drum through an extended arc with the entire width of said film in contact with said embossing surface and initially contacting said surface along a line extending axially along and spaced from the ends of said surface, and means for controlling the entrance of air into the interior of said embossing drum through the portion of the embossing surface adjacent to and contacting the lateral marginal portions of said film.

4. Apparatus for embossing thermoplastic film and the like, comprising means for heating and advancing said film along a path, an embossing drum along said path following said heating means and having a porous cylindrical embossing surface, means for guiding said film about said embossing surface through an extended arc with the lateral extremities of said film engaging said surface a pair of impervious flexible sealing belts, means for supporting and guiding said sealing belts about said embossing surface at least through a portion of said arc adjacent the start thereof, each of said belts being positioned so as to overlap one of the lateral extremities of said film immediately after said film engages said embossing surface and an adjacent portion of said embossing surface, and means for applying suction to said embossing drum.

5. Apparatus for embossing thermoplastic film and the like, comprising means for heating and advancing said film along a path, an embossing drum along said path following said heating means and having a porous cylindrical embossing surface, means for guiding said film about said embossing surface through an extended arc with the lateral extremities of said film engaging said surface, a pair of impervious flexible sealing belts, means for moving said belts toward and away from each other and for guiding said sealing belts about said embossing surface at least through a portion of said arc adjacent the start thereof, each of said belts being positioned so as to overlap one of the lateral extremities of said film immediately after said film engages said embossing surface and an adjacent portion of said embossing surface, and means for applying suction to said embossing drum.

6. An embossing drum for use in embossing thermoplastic film and the like, comprising an elongated hollow tubular shaft, a pair of annular end plates fixed to said shaft in substantially air tight relation, a plurality of annular members spaced along said shaft intermediate said end plates, an air permeable cylindrical sleeve engirdling said shaft and said end plates and rigidified by said annular members, said shaft having a plurality of apertures formed therethrough intermediate said end plates, means mounted on each of said end plates adjacent the peripheries thereof for demountably sealing said sleeve adjacent opposite ends thereof to said end plates in substantially air tight relation, and means for applying suction to the interior of said shaft and said cylinder.

7. An embossing drum for use in embossing thermoplastic film and the like, comprising an elongated hollow tubular shaft, a pair of annular end plates fixed to said shaft in substantially air tight relation, a plurality of annular members fixed to and spaced along said shaft intermediate said end plates, an air permeable cylindrical sleeve engirdling said shaft and said end plates and supported by said annular members, said shaft having a plurality of apertures formed therethrough intermediate said end plates, means mounted on each of said end plates including an inflatable annular tube adjacent the peripheries of said end plates for demountably sealing said sleeve adjacent opposite ends thereof to said end plates in substantially air tight relation when said tubes are inflated, and means for applying suction to the interior of said shaft and said cylinder.

8. An embossing drum for use in embossing thermoplastic film and the like, comprising an elongated hollow tubular shaft, a pair of annular end plates fixed to said shaft in substantially air tight relation, a plurality of annular members fixed to and spaced along said shaft intermediate said end plates, an air permeable cylindrical sleeve engirdling said shaft and said end plates and supported by said annular members, said shaft having a plurality of apertures formed therethrough intermediate said end plates, means mounted on each of said end plates adjacent the peripheries thereof for demountably sealing said sleeve adjacent opposite ends thereof to said end plates in substantially air tight relation, said sleeve having a plurality of holes formed therethrough with the holes having a predetermined axial and circumferential distribution such that a pair of annular bands are formed adjacent opposite ends of said sleeve having substantially greater porosity than the remainder of said sleeve intermediate said bands, and means for applying suction to the interior of said shaft and said cylinder.

9. An embossing drum for use in embossing thermoplastic film and the like, comprising an elongated hollow tubular shaft, a pair of annular end plates fixed to said shaft in substantially air tight relation, a plurality of annular members fixed to and spaced along said shaft intermediate said end plates, an air permeable cylindrical sleeve engirdling said shaft and said end plates and supported by said annular members, said shaft having a plurality of apertures formed therethrough intermediate said end plates, means mounted on each of said end plates adjacent the peripheries thereof for demountably sealing said sleeve adjacent opposite ends thereof to said end plates in substantially air tight relation, said sleeve having a plurality of holes formed therethrough with the holes having a predetermined axial and circumferential distribution such that a pair of annular bands are formed adjacent opposite ends of said sleeve having substantially greater porosity than the remainder of said sleeve intermediate said bands, porous material fixed to and covering the exterior of said sleeve and forming an embossing surface, means in said porous material for controlling the movement of air through said porous material in a circumferential direction relative to said sleeve, and means for applying suction to the interior of said shaft and said cylinder.

10. A method for embossing thermoplastic film and the like, comprising advancing said film along a path, expanding said advancing film laterally and longitudinally to tension the same, heating the tensioned film to embossing temperature while maintaining it taut, rotating a cool suction embossing drum having a porous cylindrical embossing surface in the path of said advancing film and at a peripheral speed equal to the speed of the advancing film, guiding said advancing film into contact with and about a major portion of said embossing surface, applying suction within said drum to the entire 360° of its embossing surface at all times, controlling the entrance of air into the portions of embossing surface adjacent to and in contact with the marginal extremities of said film as well as a line along which said film initially contacts said embossing surface, applying suction to the entire width of said advancing film through said embossing surface to emboss the same during the initial portion of its travel about said embossing drum, cooling said advancing film during a major portion of its travel about said embossing drum following said initial portion, and then further tensioning said advancing film longitudinally to urge the same away from said embossing surface.

11. An embossing drum for use in embossing thermoplastic film and the like, comprising a rotatable elongated hollow tubular member having a plurality of apertures formed therethrough, a cylindrical embossing sleeve having a diameter greater than the diameter of said tubular member and engirdling the same, means sealing said embossing sleeve to said tubular member in substantially airtight relation, porous embossing material fixed to the exterior surface of said cylindrical embossing sleeve, said cylindrical embossing sleeve having a plurality of apertures formed therethrough over the entire 360° thereof and forming communication between said embossing material and said tubular member, and means connected to said tubular member for applying suction to the interior of said tubular member and substantially simultaneously to the entire interior of said embossing sleeve.

12. In apparatus for embossing thermoplastic film, a rotatable, porous cylindrical embossing member, walls at each end of said member forming with said member a cylindrical chamber, means for heating said film to its softening temperature and for then passing said film around said embossing member through an arc of its circumference, and vacuum means for drawing air from the entire 360 degrees of the interior of said chamber at all times and for drawing room air into said chamber in the arc of its circumference not covered by said film, said vacuum means being arranged to operate with a capacity, in relation to the porosity of said member, to maintain in said chamber a subatmospheric pressure low enough to cause said film to be forced firmly against the peripheral surface of said member and thereby produce sharp embossing of said film.

13. Apparatus as in claim 12 including a pair of movable, impervious, flexible sealing belts positioned to overlap respectively the edges of said advancing film throughout a major portion of said arc, to aid in assuring uniform embossing of the entire width of said film.

14. In apparatus for embossing thermoplastic film, a porous, generally cylindrical shell having a desired design on its outer surface, a pair of end plates, one near each end of said shell, forming with said shell a cylindrical chamber, expandable and contractable means for demountably sealing the inner surface of said shell to said end plates, means for rotating said shell, means for heating said film to its softening temperature and then passing said film around said shell through an arc of its circumference, and vacuum means drawing air from the entire 360 degrees of the circumference of said chamber at all times and drawing room air into said chamber in the arc of said shell not covered by said film, said vacuum means being arranged to operate with a capacity, in relation to the porosity of said shell, to maintain in said chamber a subatmospheric pressure low enough to cause said film to be forced firmly against the peripheral surface of said shell and thereby produce sharp embossing of said film, whereby uniform embossing pressure is applied to said film despite variations in the shape of said shell.

15. Apparatus for embossing thermoplastic film comprising means for advancing said film along a path, means for heating said film to its softening temperature as it advances, a flexible, perforated metallic sleeve, a layer of porous fabric material, bearing a design, bonded to the outer surface of said sleeve and forming an embossing surface, a drive member extending longitudinally through said sleeve for rotating the same, end plates at each end of said sleeve forming, with said sleeve, a cylindrical chamber, vacuum means including a pump and a conduit for withdrawing air from the interior of said chamber through at least one of said end plates, the portions of said chamber adjacent the periphery thereof being in such communication throughout the 360 degrees of the circumference thereof that a sub-atmospheric pressure is applied therein by said vacuum means at all times throughout the 360 degrees of said circumference, and means for passing said previously heated film around said sleeve through an arc so as to emboss and then set said film, air being drawn into said chamber throughout the arc not covered by said film, said vacuum means being adapted to withdraw air from the interior of said chamber rapidly enough, in relation to the porosity of said sleeve, to cause said film to be forced firmly against the peripheral surface of said member and thereby produce sharply defined embossing of said film.

16. A method for embossing thermoplastic film, comprising advancing said film along a path, heating said advancing film to an embossing temperature, thereafter passing the thus heated film around a cool rotating, drum having a porous, cylindrical embossing surface, applying suction to the interior of said drum throughout the entire 360 degrees of its circumference at all times at a rate, in relation to the porosity of said surface, to maintain within said drum a subatmospheric pressure low enough to cause said film to be forced firmly against said embossing surface and thereby produce sharp embossing of said film, and thereafter removing said embossed film from said surface.

17. In apparatus for embossing thermoplastic film and the like, a rotating embossing drum comprising a foraminous cylindrical sleeve, porous material extending about the exterior of said sleeve and forming an embossing surface, and impervious adhesive material connecting said porous material to said sleeve, said adhesive material forming a plurality of spaced, axially extending, substantially impervious strips in said porous material and about said sleeve, means for passing a heated film around said drum, and means for applying a suction to the interior of said drum and through said sleeve and said porous material to said film, for embossing it, said impervious strips serving to block the movement of air through said porous material circumferentially about said rotating drum.

18. A method for embossing thermoplastic material, comprising applying to a cool rotating drum having a porous, cylindrical embossing surface, a hot thermoplastic material while at an embossing temperature and passing said material around said drum, applying suction to the interior of said drum throughout the entire 360 degrees of its circumference at all times at a rate, in relation to the porosity of said surface, to maintain within said drum a subatmospheric pressure low enough to cause said material to be forced firmly against said embossing surface and thereby produce sharp embossing of said material, and thereafter removing said embossed material from said surface.

References Cited in the file of this patent

UNITED STATES PATENTS

| | | |
|---|---|---|
| 1,684,615 | Berry | Sept. 18, 1928 |
| 2,345,112 | Grundel | Mar. 28, 1944 |
| 2,354,916 | Hurt | Aug. 1, 1944 |
| 2,560,581 | Leffler | July 17, 1951 |
| 2,585,915 | Chavannes | Feb. 19, 1952 |
| 2,660,757 | Smith et al. | Dec. 1, 1953 |
| 2,776,452 | Chavannes | Jan. 8, 1957 |